United States Patent
Chavan et al.

(10) Patent No.: US 10,414,972 B2
(45) Date of Patent: Sep. 17, 2019

(54) PEROXIDE CONTAINING FORMATION CONDITIONING AND PRESSURE GENERATING COMPOSITION AND METHOD

(71) Applicant: Halliburton Energy Services, Inc., Houston, TX (US)

(72) Inventors: Sandeep Vasant Chavan, Mumbai (IN); Vilas Ramtenki, Pune (IN); Rajender Salla, Pune (IN)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 15/748,727

(22) PCT Filed: Oct. 30, 2015

(86) PCT No.: PCT/US2015/058469
§ 371 (c)(1),
(2) Date: Jan. 30, 2018

(87) PCT Pub. No.: WO2017/074462
PCT Pub. Date: May 4, 2017

(65) Prior Publication Data
US 2019/0010384 A1 Jan. 10, 2019

(51) Int. Cl.
*E21B 43/267* (2006.01)
*C09K 8/68* (2006.01)
*C09K 8/66* (2006.01)
*C09K 8/80* (2006.01)
*C09K 8/88* (2006.01)

(52) U.S. Cl.
CPC .............. *C09K 8/685* (2013.01); *C09K 8/665* (2013.01); *C09K 8/80* (2013.01); *C09K 8/887* (2013.01); *E21B 43/267* (2013.01); *C09K 2208/26* (2013.01)

(58) Field of Classification Search
None
See application file for complete search history.

(56) References Cited

U.S. PATENT DOCUMENTS

| 4,748,143 A * | 5/1988 | Tabata | B01D 53/864 502/302 |
| 6,306,812 B1 | 10/2001 | Perkins et al. | |
| 8,267,176 B2 | 9/2012 | Nguyen et al. | |
| 2003/0017953 A1* | 1/2003 | Horton | C09K 8/035 507/244 |
| 2009/0023613 A1* | 1/2009 | Li | C09K 8/528 507/211 |
| 2009/0088347 A1 | 4/2009 | Mukhopadhyay et al. | |

(Continued)

FOREIGN PATENT DOCUMENTS

WO 2014182534 A1 11/2014

*Primary Examiner* — Angela M DiTrani Leff
(74) *Attorney, Agent, or Firm* — McAfee & Taft

(57) ABSTRACT

A treatment fluid comprising a peroxide source and a perovskite family catalyst is useful in processes for breaking the gelled component of a gelled fluid used in downhole operations. In particular, the treatment fluid can be useful in fracturing operations where it can not only break the gelled component of the fracturing fluid but the gaseous oxygen generated by the peroxide source and perovskite family catalyst can be used to further fracture a subterranean formation.

15 Claims, 3 Drawing Sheets

(56) References Cited

U.S. PATENT DOCUMENTS

| | | |
|---|---|---|
| 2011/0166055 A1 | 7/2011 | Reinhardt et al. |
| 2014/0113819 A1* | 4/2014 | Niksa .................. C01B 13/0214 504/151 |
| 2014/0209290 A1* | 7/2014 | Jamison .................. E21B 21/01 166/90.1 |

* cited by examiner

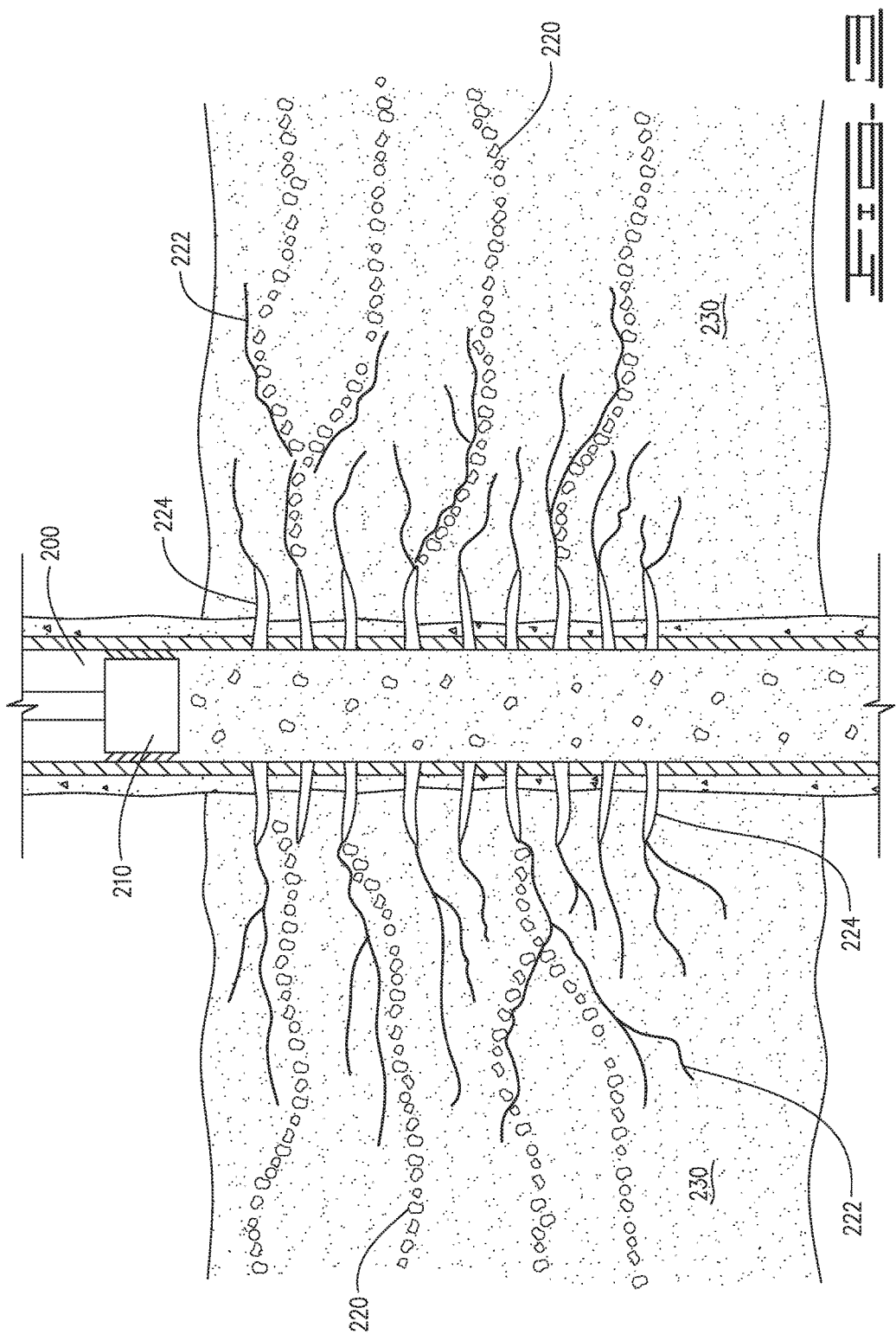

PEROXIDE CONTAINING FORMATION CONDITIONING AND PRESSURE GENERATING COMPOSITION AND METHOD

FIELD

This disclosure is related to the field of producing crude oil or natural gas from subterranean formations. More specifically, the disclosure relates to treatment fluids used in fracturing and formation conditioning operations.

BACKGROUND

To produce oil or gas from a reservoir, a well is drilled into a subterranean formation, which may be the reservoir or adjacent to the reservoir. A well includes a wellhead and at least one wellbore from the wellhead penetrating the earth. Typically, a wellbore must be drilled thousands of feet into the earth to reach a hydrocarbon-bearing formation. Generally, as the depth of the formation increases, the static pressure and temperature of the formation increases.

Well services include a wide variety of operations that may be performed in wells, such as drilling, cementing, completion, and intervention. Well services are designed to facilitate or enhance the production of desirable fluids from or through a subterranean formation. A well service usually involves introducing a well fluid, also called treatment fluid, into a well.

Drilling, completion, and intervention operations can include various types of treatments commonly performed in a wellbore or subterranean formation. For example, a treatment for fluid-loss control can be used during any of the drilling, completion, and intervention operations. During completion or intervention, stimulation is a type of treatment performed to enhance or restore the productivity of oil and gas from a well. Stimulation treatments fall into two main groups: hydraulic fracturing and matrix treatments. Fracturing treatments are performed above the fracture pressure of the subterranean formation to create or extend a highly permeable flow path between the formation and the wellbore. Matrix treatments are performed below the fracture pressure of the formation. Other types of completion or intervention treatments can include, for example, gravel packing, consolidation, and controlling excessive water production. Still other types of completion or intervention treatments include, but are not limited to, damage removal, formation isolation, wellbore cleanout, scale removal, and scale control. Of course, other well treatments and treatment fluids are known in the art.

BRIEF DESCRIPTION OF THE DRAWINGS

Implementations of the present technology will now be described, by way of example only, with reference to the attached figures, wherein:

FIG. 3 is a diagram illustrating an example of a subterranean formation in which a fracturing operation is enhanced in accordance with certain embodiments of the present disclosure.

DETAILED DESCRIPTION

Figure 1:
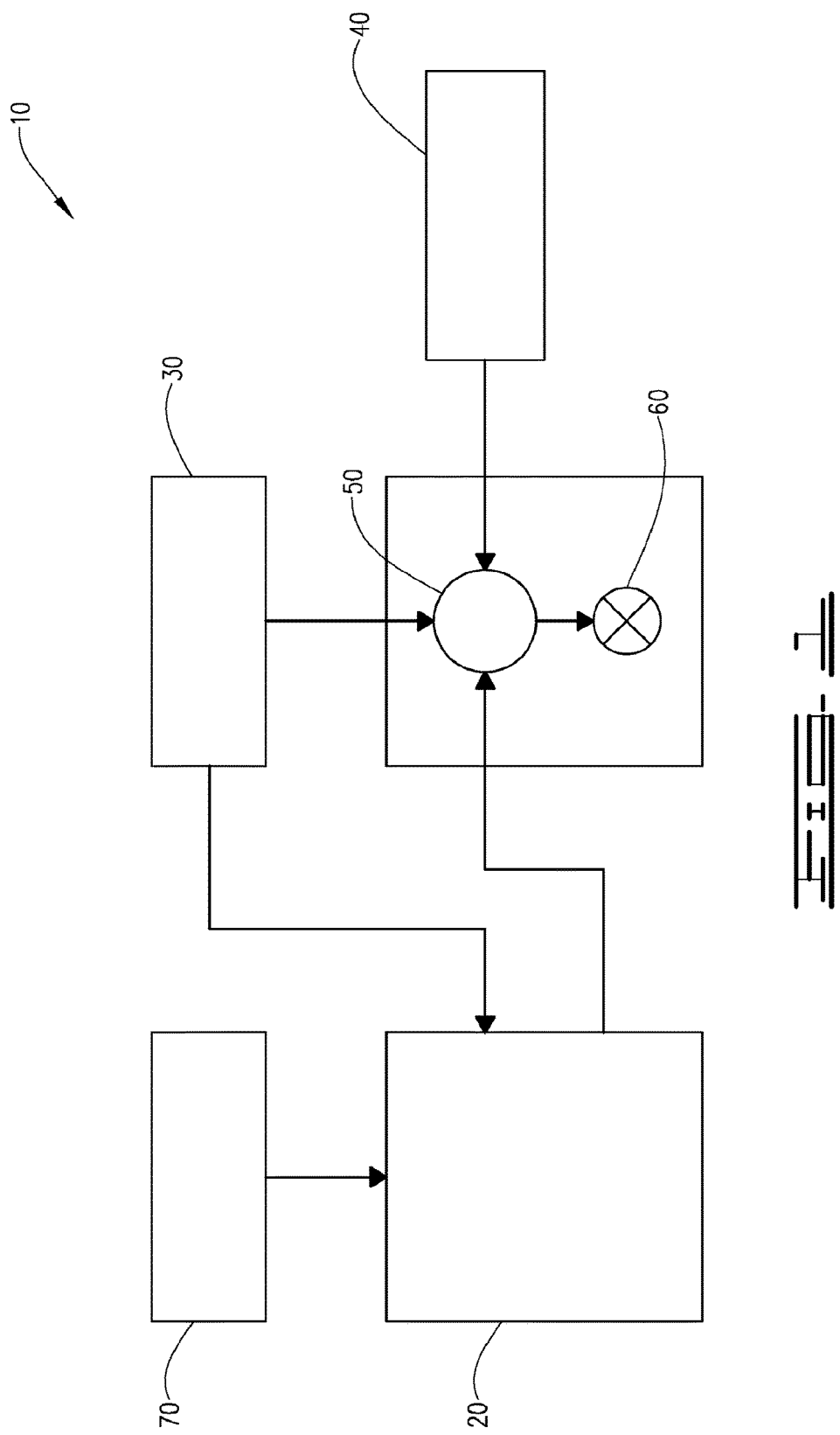
FIG. 1 is a diagram illustrating an example of a fracturing system that may be used in accordance with certain embodiments of the present disclosure.

The present disclosure may be understood more readily by reference to the following detailed description as well as to the examples included therein. For simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Viscosity-increasing agents, also called gelling agents, are used in wells for a variety of down-hole operations where higher viscosity is needed than is typically achieved by aqueous fluids without a viscosity-increasing agent. For example, in fracturing operations gelling agents are often used to increase the viscosity of the treatment fluid to better keep the fractures open and carry the proppant into the fractures. Also, in gravel pack operations gelled treatment fluids are used to place the gravel in the annulus between the wash pipe and casing or between the wash pipe and wellbore in uncased wells. Additionally, gelled treatment fluids are used in creating a filter cake. Typically, filter cakes are formed by placing a gelled treatment fluid downhole such that it forms a barrier on the surface of the subterranean formation, such as on the wellbore wall. Often filter cakes are used to stop or reduce production of fluids from the a subterranean formation.

After the proppant is introduced into the fractures, after the gravel is in place, or when the filter cake is no longer needed, the gelling agent is broken so that the viscosity of the fluid is reduced, thereby allowing the fluid to flow back to the surface and be recovered. This process may be referred to in the art as "breaking the fluid." The compositions or components employed to degrade the polymer can be referred to as "breakers."

Various embodiments of the present disclosure provide for methods and active oxidizer generating systems that are useful as gel breaking systems and are capable of breaking polymers and/or gels in oil and gas operations at low temperatures, and that produce environmentally acceptable side products. The gel breaking systems are useful in operations where it is required to break gels and specifically are useful in downhole operations that require gel breaking. Such operations include, but are not limited to, fracking operations, gravel packing operations and filter cake removal.

Additionally, various embodiments of the present disclosure provide for methods and active oxidizer generating systems that are useful in fracturing or enhancing fracturing of subsurface reservoirs.

According to various embodiments disclosed herein, there is provided a perovskite family catalyst that can be used in conjunction with at least one source of peroxide in order to generate active oxidizers. In embodiments, a treatment fluid for use in treating a subterranean formation is provided. The treatment fluid generally comprises an aqueous base fluid, a source of peroxide, and a perovskite family catalyst.

As used herein, "subterranean formation" or "formation" refers to the fundamental unit of lithostratigraphy. A subterranean formation is a body of rock that is sufficiently distinctive and continuous that it can be mapped. In the context of formation evaluation, the term refers to the volume of rock observable by measurement through, among other ways, log testing or well testing. These measurements indicate the physical properties of the rock, such as permeability.

As used herein, a "well" includes a wellbore and the near-wellbore region of rock surrounding the wellbore. As may be used herein, "into a well" means and includes into any portion of the well, including into the wellbore of the well or into a near-wellbore region of a subterranean formation along a wellbore.

As used herein, a "treatment fluid" or "fluid" refers to a fluid used in a treatment of a well or subterranean formation. A treatment fluid is typically adapted to be used to achieve a specific treatment purpose, such as stimulation, isolation, conformance control or diversion, however, the word treatment in the term treatment fluid does not necessarily imply any particular action by the fluid.

As used herein, an "aqueous base fluid" refers to aqueous fluid that, preferably, does not adversely interact with the other components used in accordance with this invention or with the subterranean formation. Suitable aqueous base fluids include fresh water, saltwater, brine, formation brine and seawater. In some embodiments, the aqueous base fluid may be present in the composition in an amount in the range from about 5% to about 99%, about 40% to about 99%, about 50% to about 99%, about 60% to about 99%, about 70% to about 99% or about 80% to about 99% by volume of the composition.

The perovskite family catalyst can be used in conjunction with at least one source of peroxide in order to treat subterranean formation and wellbores such as by enhancing subterranean fractures, removing contaminants and breaking gels, particularly those used in oil and gas operations. In particular, the perovskite and the source of peroxide can generate an active oxidizer which acts to degrade the gel or otherwise remove contaminants from the formation. Generally, the active oxidizer generated will be fundamentally gaseous oxygen. The perovskite family catalyst and the source of peroxide can efficiently generate active oxidizers at low temperatures, for example, including less than about 180° C., less than about 100° C., less than 80° C., less than 60° C., less than 40° C., and less than 30° C. Thus, perovskite family catalyst and the source of peroxide are useful in a variety of downhole operations, especially those that occur at such low temperatures. Further, the perovskite family catalyst disclosed herein can meet sensitive environmental regulations regarding chemical use downhole.

The source of peroxide may be any type of peroxide source capable of giving free hydrogen peroxide at a low temperature in aqueous solutions. Suitable peroxide sources include organic and inorganic oxidizers, and combinations thereof. While not wishing to be bound by theory, it is believed that the perovskite family catalyst acts as a catalyst to liberate gaseous oxygen from hydrogen peroxide at a highly increased rate over the normal rate of hydrogen peroxide decomposition without requiring elevated temperature or other condition altering operations. Examples of suitable peroxide sources include peroxides, persalts, hypochlorite salts and combinations thereof.

Suitable peroxides include inorganic peroxides, organic peroxides, and combinations thereof. Examples of suitable inorganic peroxides may include hydrogen peroxide, alkali metal peroxides and alkaline earth metal peroxides. Examples of suitable alkali metal peroxides may include lithium peroxide, sodium peroxide, potassium peroxide, rubidium peroxide, cesium peroxide, francium peroxide, and combinations thereof. Examples of suitable alkaline earth metal peroxides may include magnesium peroxide, calcium peroxide, beryllium peroxide, strontium peroxide, barium peroxide, radium peroxide, and combinations thereof. Examples of suitable organic peroxides include urea-hydrogen peroxide, hydrogen peroxide, dibenzoyl peroxide, tertiarybutyl peroxide, urea peroxide, and combinations thereof.

Suitable persalts include inorganic persalts, persulfates, perborates, percarbonates, perphosphates, and combinations thereof. Suitable persulfates include ammonium persulfate, alkali metal persulfates, alkaline earth metal persulfates, and combinations thereof. Examples of suitable alkali metal persulfates include lithium persulfate, sodium persulfate, potassium persulfate, rubidium persulfate, cesium persulfate, francium persulfate, and combinations thereof. Examples of suitable alkaline earth metal persulfates include magnesium persulfate, calcium persulfate, beryllium persulfate, strontium persulfate, barium persulfate, radium persulfate, and combinations thereof.

Suitable perborates include ammonium perborate, alkali metal perborates, alkaline earth metal perborates, and combinations thereof. Examples of suitable alkali metal perborates include lithium perborate, sodium perborate, sodium perborate monohydrate, sodium perborate tetrahydrate, potassium perborate, rubidium perborate, cesium perborate, francium perborate, and combinations thereof. Examples of suitable alkaline earth metal perborates include magnesium perborate, calcium perborate, beryllium perborate, strontium perborate, barium perborate, radium perborate, and combinations thereof.

Suitable percarbonates include alkali metal percarbonates, alkaline earth metal percarbonates, and combinations thereof. Examples of suitable alkali metal percarbonates include lithium percarbonate, sodium percarbonate, potassium percarbonate, rubidium percarbonate, cesium percarbonate, francium percarbonate, and combinations thereof. Examples of suitable alkaline earth metal percarbonates include magnesium percarbonate, calcium percarbonate, beryllium percarbonate, strontium percarbonate, barium percarbonate, radium percarbonate, and combinations thereof.

Suitable perphosphates include alkali metal perphosphates, alkaline earth metal perphosphates, and combinations thereof. Examples of suitable alkali metal perphosphates include lithium perphosphate, sodium perphosphate, sodium pyrophosphate peroxyhydrate, potassium perphosphate, rubidium perphosphate, cesium perphosphate, francium perphosphate, and combinations thereof. Examples of suitable alkaline earth metal perphosphates include magnesium perphosphate, calcium perphosphate, beryllium perphosphate, strontium perphosphate, barium perphosphate, radium perphosphate, and combinations thereof.

Suitable hypochlorite salts include alkali metal hypochlorite salts, alkaline earth metal hypochlorite salts, and combinations thereof. Examples of suitable alkali metal hypochlorite salts include lithium hypochlorite, sodium hypochlorite, potassium hypochlorite, rubidium hypochlorite, cesium hypochlorite, francium hypochlorite, and combinations thereof. Examples of suitable alkaline earth metal hypochlorite salts include magnesium hypochlorite, calcium hypochlorite, beryllium hypochlorite, strontium hypochlorite, barium hypochlorite, radium hypochlorite, and combinations thereof.

The peroxide source can be present in an amount of from about 0.1% to about 99.9% wt./vol. of active oxidizer generating systems or treatment fluid, or from about 0.1% to about 10%, or in the range of about 0.3% to about 7%, or in the range of from about 0.3% to about 4% wt./vol. For example, the peroxide source may be present in at least about 0.6% wt./vol. (50 lb/Mgal) of the active oxidizer generating systems or treatment fluid, and alternatively in the range of about 0.6% wt./vol. (50 lb/Mgal) to about 3% wt./vol. (250 lb/Mgal) of the active oxidizer generating systems or treatment fluid, although much greater concentrations can be used. More generally, the peroxide source may be present in a gel breaker composition in a sufficient concentration to substantially reduce the viscosity of a treatment fluid or cross-linked gel or polymer. Similarly, the peroxide source may be present in a fracturing enhancing composition in a sufficient concentration to generate sufficient oxidization gas to substantially generate or substantially enhance the fractures in a subsurface formation.

The perovskite family catalyst can be present in an amount of from 0.001% to 99.5% wt./vol. of the gel breaking system and more preferably in a range of about 0.001% to about 20% or from about 0.01% to about 8%.

The perovskite family materials have a cubic structure with general formula of $ABO_3$. In this site structure, an A-site ion, on the corners of the lattice, is usually and alkaline earth or rare earth element. B site ions, on the center of the lattice, can be transition metal elements. Generally, embodiments of the current invention will generally have a perovskite family catalyst comprised of A-site ions selected from one or more elements from the group consisting of alkaline earth or rare earth elements and B-site ions selected from one or more elements from the group consisting of transition metals. Of particular interest are perovskite family catalyst comprised of at least two different A-site ions. The first A-site ion selected from the group of rare earth elements and the second A-site ion selected from the group of alkaline earth elements. More particularly, the first A-site can be selected from one or more ions selected from the group consisting of La, Pr, Nd, Gd, Sm, Y and Ce and the second A-site can be selected from one or more ions selected from the group consisting of Mg, Ca, Sr or Ba. Additionally, the B-site ions can be selected from one or more ions of the group consisting Ni, Cu, Mn, Fe or Co.

In many embodiments, the perovskite family catalyst can be selected from the group consisting of perovskite family materials having the formula $\Phi_{1-x}\Psi_x\Omega_{1-y}\Sigma_yO_{3-\delta}$ and mixtures thereof, where $\Phi$ is La, Pr, Nd, Gd, Sm, Y or Ce; $\Psi$ is Mg, Ca, Sr or Ba; $\Omega$ is Ni, Cu, Mn, Fe or Co; and $\Sigma$ is Ni, Cu, Mn, Fe or Co; and where x and y are numbers ranging from 0.0 to 1.0 and in some embodiments x and/or y can be a number ranging from 0.1 to 0.9. $\delta$ represents oxygen ion deficiency due to any aliovalent substitution in the A and B site. Aliovalent substitution is where the ion that is substituting the original ion is of a different oxidation state than the ion it is replacing. Examples of suitable perovskite family catalyst series are: $La_{1-x}Sr_xFe_{1-y}Ni_yO_{3-\delta}$; $La_{1-x}Sr_xFe_{1-y}Cu_yO_{3-\delta}$; $La_{1-x}Sr_xFe_{1-y}Mn_yO_{3-\delta}$; $La_{1-x}Sr_xFe_{1-y}Co_yO_{3-\delta}$; $La_{1-x}Mg_xFe_{1-y}Ni_yO_{3-\delta}$; $La_{1-x}Mg_xFe_{1-y}Cu_yO_{3-\delta}$; $La_{1-x}Mg_xFe_{1-y}Mn_yO_{3-\delta}$; $La_{1-x}Mg_xFe_{1-y}Co_yO_{3-\delta}$; $La_{1-x}Sr_xMn_{1-y}Ni_yO_{3-\delta}$; $Pr_{1-x}Sr_xMn_{1-y}Cu_yO_{3-\delta}$; $Pr_{1-x}Ca_xFe_{1-y}Mn_yO_{3-\delta}$; $Nd_{1-x}Ba_xCu_{1-y}Co_yO_{3-\delta}$; $Sm_{1-x}Mg_xCo_{1-y}Ni_yO_{3-\delta}$; $Y_{1-x}Ca_xFe_{1-y}Cu_yO_{3-\delta}$; and other series that will be readily derived from the formula $\Phi_{1-x}\Psi_x\Omega_{1-y}\Sigma_yO_{3-\delta}$. Examples of suitable catalysts from the above series are $La_{0.8}Sr_{0.2}Fe_{0.9}Ni_{0.1}O_{3-\delta}$; $La_{0.6}Sr_{0.4}Fe_{0.8}Cu_{0.2}O_{3-\delta}$; $Pr_{0.8}Sr_{0.2}Mn_{0.8}Co_{0.2}O_{3-\delta}$; $Y_{0.6}Sr_{0.4}Fe_{0.7}Co_{0.3}O_{3-\delta}$; $Sm_{0.7}Mg_{0.3}Fe_{0.7}Ni_{0.3}O_{3-\delta}$; $La_{0.4}Mg_{06}Mn_{0.7}Cu_{0.3}O_{3-\delta}$; $La_{0.8}Mg_{0.2}Fe_{0.5}Mn_{0.5}O_{3-\delta}$; $Pr_{0.6}Mg_{0.4}Fe_{0.9}Co_{0.1}O_{3-\delta}$; $Gd_{0.1}Sr_{0.9}Mn_{0.8}Ni_{0.2}O_{3-\delta}$; $Pr_{0.4}Sr_{0.6}Mn_{0.9}Cu_{0.1}O_{3-\delta}$; $La_{0.9}Ca_{0.1}Fe_{0.5}Mn_{0.5}O_{3-\delta}$; and other catalyst that will be readily derived from series of the general formula $\Phi_{1-x}\Psi_x\Omega_{1-y}\Sigma_yO_{3-\delta}$. However, it will be realized that generally the catalyst used will be a mixture of crystals of differing different x and y values. For example, a catalyst particle of $La_{1-x}Sr_xFe_{1-y}Ni_yO_{3-\delta}$ can contain regions where x is 0.1, other regions where x is 0.3 and still other regions where x is 0.7. Similarly, the catalyst particle can of regions where y is 0.2, other regions where, y is 0.7 and still other regions where y is 0.9.

Currently preferred are perovskite family catalyst selected from the group consisting of perovskite family materials having the formula $\Phi_{1-x}\Psi_x\Omega O_{3-\delta}$ and mixtures thereof, where $\Phi$ is La, Pr, Nd, Gd, Sm, Y or Ce; $\Psi$ is Mg, Ca, Sr or Ba; $\Omega$ is Ni, Cu, Mn, Fe or Co; and where x is a number ranging from 0.0 to 1.0, and in some embodiments x is a number ranging from 0.1 to 0.9. $\delta$ represents oxygen ion deficiency due to any aliovalent substitution in the A and B site. Examples of suitable perovskite family catalyst series are: $La_{1-x}Sr_xFeO_{3-\delta}$; $Pr_{1-x}Sr_xFeO_{3-\delta}$; $Nd_{1-x}Sr_xFeO_{3-\delta}$; $Gd_{1-x}Sr_xFeO_{3-\delta}$; $Sm_{1-x}Sr_xFeO_{3-\delta}$; $Y_{1-x}Sr_xFeO_{3-\delta}$; $La_{1-x}Mg_xFeO_{3-\delta}$; $La_{1-x}Ca_xFeO_{3-\delta}$; $La_{1-x}Ba_xFeO_{3-\delta}$; $La_{1-x}Mg_xCoO_{3-\delta}$; $La_{1-x}Ca_xCuO_{3-\delta}$; $La_{1-x}Ca_xNiO_{3-\delta}$; $La_{1-x}Ca_xNiO_{3-\delta}$; $La_{1-x}Ca_xMnO_{3-\delta}$; $La_{1-x}Ca_xCoO_{3-\delta}$; $Pr_{1-x}Ca_xMnO_{3-\delta}$; $Pr_{1-x}Ca_xNiO_{3-\delta}$; $Nd_{1-x}Ca_xCuO_{3-\delta}$; $Sm_{1-x}Mg_xMnO_{3-\delta}$; $Pr_{1-x}Ca_xCoO_{3-\delta}$; $La_{1-x}Ba_xFeO_{3-\delta}$; $La_{1-x}Ba_xNiO_{3-\delta}$; $La_{1-x}Ba_xCuO_{3-\delta}$; $La_{1-x}Ba_xMnO_{3-\delta}$; $La_{1-x}Ba_xCoO_{3-\delta}$, and other series that will be readily derived from the general formula $\Phi_{1-x}\Psi_x\Omega_{1-y}O_{3-\delta}$. Examples of suitable catalysts from the above series are $Pr_{0.9}Sr_{0.1}FeO_{3-\delta}$; $Nd_{0.7}Sr_{0.3}FeO_{3-\delta}$; $Gd_{0.3}Sr_{0.7}FeO_{3-\delta}$; $Sm_{0.4}Sr_{0.6}FeO_{3-\delta}$; $Y_{0.8}Sr_{0.2}FeO_{3-\delta}$; $La_{0.5}Mg_{0.5}FeO_{3-\delta}$; $La_{0.6}Ca_{0.4}FeO_{3-\delta}$; $La_{0.9}Ba_{0.1}FeO_{3-\delta}$; $La_{0.2}Mg_{0.8}CoO_{3-\delta}$; $La_{0.7}Ca_{0.3}CuO_{3-\delta}$; $La_{0.4}Ca_{0.6}NiO_{3-\delta}$; $La_{0.9}Ca_{0.1}NiO_{3-\delta}$; $La_{0.3}Ca_{0.7}MnO_{3-\delta}$; $La_{0.8}Ca_{0.2}CoO_{3-\delta}$; and other catalyst that will be readily derived from series of the general formula $\Phi_{1-x}\Psi_x\Omega O_{3-\delta}$. However, it will be realized that generally the catalyst used will be a mixture of crystals of differing different x values. For example, a catalyst particle of $La_{1-x}Sr_xFeO_{3-\delta}$ can contain regions where x is 0.1, other regions where x is 0.3 and still other regions where x is 0.7.

Of these perovskite family catalysts containing La and Sr at the A sites are currently viewed as being more useful in embodiments. Accordingly, the perovskite family catalyst can be selected from the group consisting of the following series: $La_{1-x}Sr_xFeO_{3-\delta}$; $La_{1-x}Sr_xNiO_{3-\delta}$; $La_{1-x}Sr_xCuO_{3-\delta}$; $La_{1-x}Sr_xMnO_{3-\delta}$; $La_{1-x}Sr_xCoO_{3-\delta}$; $La_{1-x}Mg_xFeO_{3-\delta}$; $La_{1-x}Mg_xNiO_{3-\delta}$; $La_{1-x}Mg_xCuO_{3-\delta}$; $La_{1-x}Mg_xMnO_{3-\delta}$; $La_{1-x}Mg_xCoO_{3-\delta}$; $La_{1-x}Ca_xFeO_{3-\delta}$; $La_{1-x}Ca_xNiO_{3-\delta}$; $La_{1-x}Ca_xCuO_{3-\delta}$; $La_{1-x}Ca_xMnO_{3-\delta}$; $La_{1-x}Ca_xCoO_{3-\delta}$; $La_{1-x}Ga_xFeO_{3-\delta}$; $La_{1-x}Ga_xNiO_{3-\delta}$; $La_{1-x}Ga_xCuO_{3-\delta}$; $La_{1-x}Ga_xMnO_{3-\delta}$; $La_{1-x}Ga_xCoO_{3-\delta}$; $La_{1-x}Ba_xFeO_{3-\delta}$; $La_{1-x}Ba_xNiO_{3-\delta}$; $La_{1-x}Ba_xCuO_{3-\delta}$; $La_{1-x}Ba_xMnO_{3-\delta}$; $La_{1-x}Ba_xCoO_{3-\delta}$; and mixtures of catalyst selected from these series.

In certain embodiments, the perovskite family catalyst selected from the group consisting of the $La_{1-x}Sr_xFeO_{3-\delta}$ series and mixtures thereof can be used. Examples of suitable catalyst in this series include $La_{0.9}Sr_{0.1}FeO_{3-\delta}$; $La_{0.8}Sr_{0.2}FeO_{3-\delta}$; $La_{0.7}Sr_{0.3}FeO_{3-\delta}$; $La_{0.6}Sr_{0.4}FeO_{3-\delta}$; $La_{0.5}Sr_{0.5}FeO_{3-\delta}$; $La_{0.4}Sr_{0.6}FeO_{3-\delta}$; $La_{0.3}Sr_{0.7}FeO_{3-\delta}$; $La_{0.2}Sr_{0.8}FeO_{3-\delta}$; $La_{0.1}Sr_{0.9}FeO_{3-\delta}$ and catalyst particles comprising mixtures of these catalyst.

Gel Breaking

Viscosity-increasing fluids, also called gelling fluids are used in wells for a variety of down-hole operations where higher viscosity is needed than is typically achieved by aqueous fluids without a viscosity-increasing fluid. For example, in fracturing operations gelling fluids are often used to increase the viscosity of the treatment fluid to better keep the fractures open and carry the proppant into the fractures. Also, in gravel pack operations, gelling fluids are used to place the gravel in the annulus between the wash pipe and casing or between the wash pipe and wellbore in uncased wells. Additionally, gelling fluids are used in creating a filter cake. Typically, filter cakes are formed by placing a gelling fluid downhole such that it forms a barrier on the surface of the subsurface reservoir, such as on the wellbore wall. Often filter cakes are used to stop or reduce production of fluids from a reservoir.

After the proppant is introduced into the fractures, after the gravel is in place, or when the filter cake is no longer needed, the treatment fluid is introduced and the gel component is broken so that the viscosity of the fluid is reduced, thereby allowing the fluid to flow back to the surface and be recovered. The compositions or components employed to degrade the polymer can be referred to as "breakers."

The active oxidizer generating systems described above can be used in a variety of methods, which can be useful for breaking a natural polymer or synthetic polymer (often referred to as a gel) particularly in a down-hole oil or gas operation. Such operations include, but are not limited to, fracking operations, gravel packing operations and filter cake removal.

For example, various embodiments relate to a method that involves introducing the active oxidizer generating systems into a wellbore penetrating a subterranean formation either with or after a treatment fluid comprising a gel is added. The active oxidizer generating systems is introduced so that it interacts with the gelled treatment fluid to break the gel. In some instances, a treatment fluid containing a gelling agent is introduced down-hole and gelled once it is at a predetermined location in the wellbore or in the subterranean formation by the action of a cross-linking agent. In these instances, the active oxidizer generating systems can be added after the gelled treatment fluid is gelled down-hole. The methods according to various embodiments allow the gel to be substantially broken within a time period of from about 1 to about 72 hours. For example, the methods according to various examples allow the gel to be substantially broken within a time period of about 24 hours.

The amount of peroxide source used to break the gel component may be from about 0.1% to about 99.9% wt./vol of aqueous base fluid. The oxidizing agent may also be in the amount of about 0.1% to about 10% wt./vol of aqueous base fluid, or in the range of from about 1% to about 5% wt./vol of aqueous base fluid. More generally, the oxidizing agents may be present in the treatment fluid in a sufficient concentration to effectively reduce the viscosity of a cross-linked gel or polymer.

The perovskite family catalyst can be present in an amount of from 0.001% to 99.5 wt./vol of aqueous base fluid. More preferably, the perovskite family catalyst can be present in the range of about 0.001% to about 20% or from about 0.01% to about 10%.

Suitable treatment fluids comprise a gelling agent in an aqueous fluid. Suitable aqueous fluids include fresh water, salt water, brine, formation brine, seawater, or any other aqueous fluid that, preferably, does not adversely interact with the other components used in accordance with this invention or with the subterranean formation. In some embodiments, the aqueous fluid may be present in the gelling fluids in an amount in the range from about 5% to 99.99% by volume of the gelling fluid.

Suitable gelling agents for aqueous based fluids include water-soluble polymers. Such gelling agents include natural and synthetic polymers bearing borate cross-linkable functional groups. Synthetic polymers, such as polyacrylamides and polyacrylates, can be used as the gelling agent. Natural polymers include high-molecular weight polysaccharides, such as cellulose, polysaccharides composed of mannose and galactose sugars (galactomannans), and polysaccharides composed of mannose and glucose. For example, gelling agents can include cellulose, galactomannans, diutan and xanthan and can include derivatives thereof. Of the various galactomannan gelling agents, which can be utilized, guar and guar derivatives are preferred. Guar derivatives, for example, include hydropropyl guar (HPG), carboxymethyl guar (CMG), carboxymethylhydropropyl guar (CMHPG) and hydroxyethylated guar (HEG).

Cellulose derivatives, for example, include hydroxyethylcellulose (HEC), hydroxypropylcellulose (HPC), carboxymethyl cellulose (CMC) and carboxymethylhydroxyethylcellulose (CMHEC). Preferred are galactomannan gelling agents selected from the group consisting of guar, hydroxyethylguar, hydroxypropylguar, carboxymethylguar, carboxymethylhydroxyethylguar, and mixtures thereof.

Typically, the concentration of gelling agent in the aqueous fluid will depend on the desired viscosity. Often such concentrations are from about 5 lb/1000 gal of aqueous fluid to about 100 lb/1000 gal of aqueous fluid.

Gelling agents are sometimes activated by the addition of a cross-linker to the treatment fluid. Cross-linkers cause portions of the polymer or polymers comprising the gelling agent to interact with one another. Generally, the more the polymers or chemicals comprising the gelling agent interact with one another, the greater the viscosity of the treatment fluid.

Cross-linkers can be either instant or delayed cross-linkers. Instant cross-linkers tend to cause the polymers comprising the gelling agent to interact with one another quickly. Stated another way, instant cross-linkers cause a quick increase in viscosity or gelling of the treatment fluid. Typically, a substantial increase in viscosity or gelling of the treatment fluid will occur in under a minute and more typically in less than 30 seconds. Delayed cross-linkers tend to cause the polymers comprising the gelling agent to interact with one another more slowly. Depending on the delayed cross-linker, it can take on the order of a minute, several minutes or even an hour or more for a substantial increase in viscosity. With instant and delayed cross-linkers, the viscosity of the treatment fluid can be carefully controlled. Examples of instant cross-linkers include borate salts, boric acid, or boron trioxide as well as cations of zirconium, titanium aluminum, iron, magnesium as well as compounds containing boron.

Examples of delayed cross-linkers include polyhydroxyl containing compounds including glycerol, erythritol, threitol, ribitol, arabinitol, xylitol, allitol, altritol, sorbitol, mannitol, dulcitol, iditol and perseitol, zirconium-based cross-linkers, based on triethanolamine or hydroxyalkylated ethylenediamine. Although examples of instant and delayed cross-linkers have been provided, whether a particular compound acts as a delayed cross-linker or an instant cross-linker can depend on a variety of circumstances, especially the temperature of the fluid in the wellbore carrying the cross-linker.

In certain embodiments, the treatment fluids also may optionally comprise salts, pH control additives, surfactants, breakers, bactericides, fluid loss control additives, stabilizers, chelants, scale inhibitors, paraffin inhibitors, asphaltene inhibitors, mutual solvents, solvents, corrosion inhibitors, hydrate inhibitors, clay stabilizers, relative permeability modifiers (such as HPT-1™ chemical additive available from Halliburton Energy Services, Duncan, Okla.), sulfide scavengers, fibers, nanoparticles, consolidating agents (such as resins and/or tackifiers), combinations thereof, or the like.

As previously, indicated the active oxidizer generating systems can be used in various down-hole operations using a gelled treatment fluid, including fracturing operations, gravel packing operations and formation conditioning operations. In use, the exemplary methods and compositions disclosed herein may also directly or indirectly affect one or more components or pieces of equipment associated with the preparation, delivery, recapture, recycling, reuse, and/or disposal of the disclosed compositions.

Formation Conditioning

Generally, wells contain unconsolidated particulates (e.g., sand, gravel, proppant, fines, etc.) that may migrate out of the subterranean formation with the oil, gas, water, and/or other fluids produced by the wells. The presence of such particulates in produced fluids is undesirable in that the particulates may abrade pumping and other producing equipment and/or reduce the production of desired fluids from the well. Moreover, particulates that have migrated into a well bore (e.g., inside the casing and/or perforations in a cased hole), among other things, may clog portions of the well bore, hindering the production of desired fluids from the well. The term "unconsolidated particulates," and derivatives thereof, is defined herein to include loose particulates and particulates bonded with insufficient bond strength to withstand the forces created by the production of fluids through the formation. Unconsolidated particulates may comprise, among other things, sand, gravel, fines and/or proppant particulates in the subterranean formation, for example, proppant particulates placed in the subterranean formation in the course of a fracturing or gravel-packing operation.

One method used to control particulates involves consolidating unconsolidated particulates into stable, permeable masses by applying a consolidating agent (e.g., a resin or tackifying agent) to a portion of the subterranean formation. The application of such resins or tackifying agents is often referred to as a consolidation treatment. One problem that may be experienced in such consolidation treatments is the failure of the resin or tackifying agent to adhere to the rock surfaces of the formation. This failure may be due to the presence of oil, condensates, or other debris (collectively referred to herein as "contaminants") on the rock surfaces.

To combat this contaminants problem, oftentimes the formation may be pretreated prior to the consolidation treatment in an attempt to remove the oil and/or the debris and prepare the surface of the formation rock to allow the resin or tackifier (i.e. consolidation agent) to adhere to its surface (i.e. "formation conditioning"). Glycol ethers are an example of a type of solvent that may be used in such pre-treatments. The use of such solvents is very expensive because high concentrations of the solvent are necessary to achieve any sort of contaminant reduction. For example, it is often recommended that solutions comprising about 50% to about 100% of the solvent be used in relatively large pre-treatments. Additionally, many of these solvents present toxicity and handling concerns.

When the down-hole operation includes the use of a treatment fluid containing the disclosed active oxidizer generating system for formation conditioning, the treatment fluids are very efficient at removing contaminants from the rock surfaces. When compared to standard solvent pre-treatment techniques, the disclosed active oxidizer generating systems have high efficiency at a lower cost. Another benefit is that the disclosed treatment fluids are less expensive than solvent pre-treatments, and do not present the same sort of toxicity or handling concerns. Accordingly, the treatment fluid can include an aqueous base fluid, a perovskite family catalyst and a peroxide source in order to remove contaminants from the rock surfaces in down-hole operations.

The amount of peroxide source used may be from about 0.1% to about 99.9% wt./vol of aqueous base fluid. The peroxide source may also be in the amount of about 0.1% to about 10% wt./vol of aqueous base fluid, or in the range of from about 1% to about 5% wt./vol of aqueous base fluid. More generally, the peroxide source may be present in the treatment fluid in sufficient quantity to effectively remove contaminates in the subterranean formation.

The perovskite family catalyst can be present in an amount of from 0.001% to 99.5 wt./vol of aqueous base fluid. More preferably, the perovskite family catalyst can be present in the range of about 0.001% to about 20% or from about 0.01% to about 10%.

A disclosed embodiment may include introducing the treatment fluid into a treatment zone of a well to remove contaminates from at least a portion of the treatment zone to form a cleaned portion. The treatment fluid removes the oil and/or the debris and prepares the surface of the formation rock in the subterranean formation to allow for a consolidation agent to adhere to its surface (i.e. "formation conditioning"). Subsequent to introducing the treatment fluid to remove contaminates, one can introduce a consolidation agent into the cleaned portion of the treatment zone.

Suitable consolidation agents include resins, tackifiers, multifunctional materials, emulsions and combinations thereof.

Suitable resins for use as a consolidation agent include all resins known in the art that are capable of forming a hardened, consolidated mass. Many such resins are commonly used in subterranean consolidation operations, and some suitable resins include two component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof.

Tackifiers for use as a consolidation agent may include any compound that, when in liquid form or in a solvent solution, will form a tacky, non-hardening coating upon a particulate. Suitable tackifiers include non-aqueous tackifying agents; aqueous tackifying agents; silyl-modified polyamides, and reaction products of an amine and a phosphate ester.

Suitable multifunctional materials for use as a consolidation agent include, but are not limited to, aldehydes, dialdehydes such as glutaraldehyde, hemiacetals or aldehyde releasing compounds, diacid halides, dihalides such as dichlorides and dibromides, polyacid anhydrides such as citric acid, epoxides, furfuraldehyde, glutaraldehyde, aldehyde condensates, and silyl-modified polyamide compounds and the like, and combinations thereof. Suitable silyl-modified polyamide compounds that may be used in the present invention are those that are substantially self-hardening compositions capable of at least partially adhering to particulates in the unhardened state, and that are further capable of self-hardening themselves to a substantially non-tacky state to which individual particulates such as formation fines will not adhere to, for example, in formation or proppant pack pore throats. Such silyl-modified polyamides may be based, for example, on the reaction product of a silating compound with a polyamide or a mixture of polyamides. The polyamide or mixture of polyamides may be one or more polyamide intermediate compounds obtained, for example, from the reaction of a polyacid (e.g., diacid or higher) with a polyamine (e.g., diamine or higher) to form a polyamide polymer with the elimination of water.

In embodiments where the consolidating agent is used in an emulsion form, the consolidating agent emulsions of the present invention comprise an aqueous fluid, a surfactant, and a consolidating agent. These consolidating agent emulsions have water external phases and oil internal phases. Suitable consolidating agents for the emulsion embodiments comprise all of the consolidation agents listed above. The consolidation agent may be present in an amount in the range from about 0.1% to about 10% by weight of the composition. The surfactant is preferably present in the consolidation agent emulsion in an amount in the range from about 0.1% to 10% by weight of the composition. The balance of the fluid is the aqueous base fluid (e.g., 40% to 97% by weight of the consolidation agent emulsion composition).

Fracturing Operations

The active oxidizer generating systems described above can be used in fracturing operations. Not only can it be useful in breaking gels used in fracturing operations, it also can be useful in enhancing fractures generating during fracturing operations and in generating additional fractures in the subsurface formations. The use of the active oxidizer generating systems in fracturing operations will be further described with reference to FIGS. 1-3.

As illustrated in FIG. 1, the disclosed methods and compositions may be used in fracturing operations and may directly or indirectly affect one or more components or pieces of equipment associated with an exemplary fracturing system 10, according to one or more embodiments. In certain instances, the system 10 includes a fracturing fluid producing apparatus 20, a fluid source 30, a proppant source 40, and a pump and blender system 50 and resides at the surface at a well site where a well 60 is located. In certain instances, the fracturing fluid producing apparatus 20 combines a gel pre-cursor with fluid (e.g., liquid or substantially liquid) from fluid source 30, to produce a hydrated fracturing fluid that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, the fracturing fluid may comprise water, a hydrocarbon fluid, a polymer gel, foam, air, wet gases and/or other fluids.

The proppant source 40 can include a proppant for combination with the fracturing fluid. The system may also include additive source 70 that provides one or more additives (e.g., gelling agents, weighting agents, and/or other optional additives) to alter the properties of the fracturing fluid. For example, the other additives 70 can be included to reduce pumping friction, to reduce or eliminate the fluid's reaction to the geological formation in which the well is formed, to operate as surfactants, and/or to serve other functions. In some instances, the perovskite family catalyst and peroxide source can be added as additives from additive source 70. In such cases, the perovskite family catalyst or peroxide source can be added in an encapsulated form to delay the release of one of the components so as to delay the perovskite family catalyst effects on the peroxide source and, thus, delay generation of the oxidizer. The de-capsulation can be triggered by time, temperature, pH or any other suitable trigger. Alternatively, the peroxide source and perovskite family catalyst may be introduced into the well at differing times so that they come in contact with one another only in the treatment zone.

To provide for a controlled release, the peroxide source, the perovskite family catalyst, or both may be in encapsulated form or coated form. Accordingly, the oxidizing agent and activator may be contemporaneously introduced into the well with the treatment fluid. The perovskite family catalyst and peroxide source can be encapsulated with various materials. Solid catalyst can be encapsulated by spray coating a variety of materials thereon. Such coating materials include, but are not limited to, waxes, drying oils such as tung oil and linseed oil, polyurethanes and cross-linked partially hydrolyzed polyacrylics. The peroxide sources are preferably encapsulated with a membrane comprising a partially hydrolyzed acrylic cross-linked with either an aziridine prepolymer or a carbodiimide, the membrane having imperfections through which an aqueous fluid can diffuse. De-encapsulation may be triggered occasionally by various stimuli like pH, temperature, magnetic waves etc.

In some instances, the active oxidizer generating systems can be added separately from the fracturing fluid so as to break the gelled fluid after fracturing and or to enhance fracturing, as further described below. In such instances, the catalyst and peroxide sources can be introduced in an encapsulated or un-encapsulated form depending the specifics of the system used.

Returning now to FIG. 1, the pump and blender system 50 receives the fracturing fluid and combines it with other components, including proppant from the proppant source 40 and/or additional fluid from the additives 70. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppants, and/or other compositions to the pumping and blender system 50. Such metering devices may permit the pumping and blender system 50 can source from one, some or all of the different sources at a given time, and may facilitate the preparation of fracturing fluids in accordance with the present disclosure using continuous mixing or "on-the-fly" methods. Thus, for example, the pumping and blender system 50 can provide just fracturing fluid into the well at some times, just proppants at other times, just active oxidizer generating system at still other times and combinations of those components at yet other times.

Figure 2:
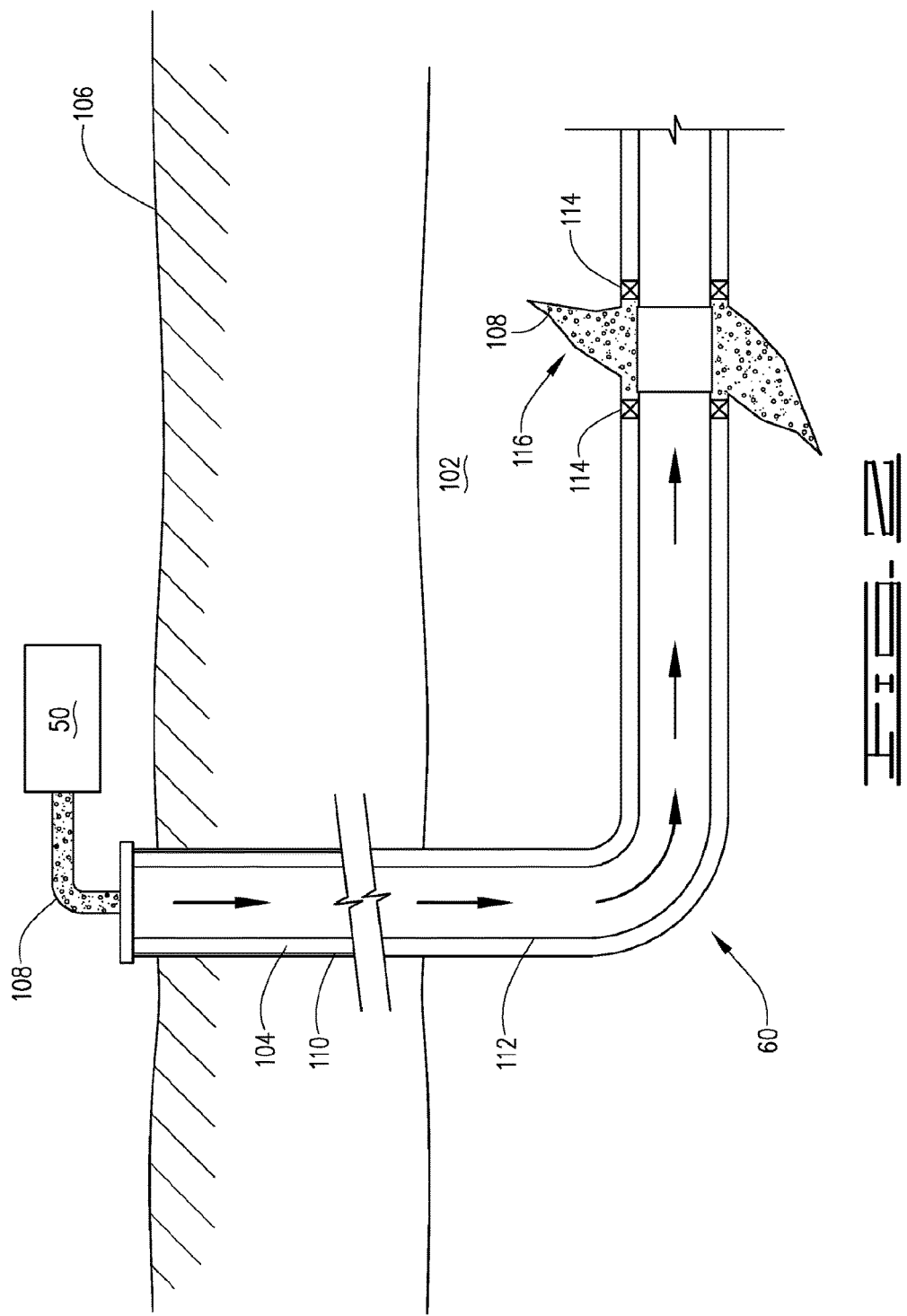
FIG. 2 is a diagram illustrating an example of a subterranean formation in which a fracturing operation may be performed in accordance with certain embodiments of the present disclosure.

FIG. 2 shows the well 60 during a fracturing operation in a portion of a subterranean formation of interest 102 surrounding a well bore 104. The well bore 104 extends from the surface 106, and the fracturing fluid 108 is applied to a portion of the subterranean formation 102 surrounding the horizontal portion of the well bore. Although shown as vertical deviating to horizontal, the well bore 104 may include horizontal, vertical, slant, curved, and other types of well bore geometries and orientations, and the fracturing treatment may be applied to a subterranean zone surrounding any portion of the well bore. The well bore 104 can include a casing 110 that is cemented or otherwise secured to the well bore wall. The well bore 104 can be uncased or include uncased sections. Perforations can be formed in the casing 110 to allow fracturing fluids and/or other materials to flow into the subterranean formation 102. In cased wells, perforations can be formed using shape charges, a perforating gun, hydro jetting and/or other tools.

The well is shown with a work string 112 depending from the surface 106 into the well bore 104. The pump and blender system 50 is coupled a work string 112 to pump the fracturing fluid 108 into the well bore 104. The working string 112 may include coiled tubing, jointed pipe, and/or other structures that allow fluid to flow into the well bore 104. The working string 112 can include flow control devices, bypass valves, ports, and or other tools or well devices that control a flow of fluid from the interior of the working string 112 into the subterranean zone 102. For example, the working string 112 may include ports adjacent the well bore wall to communicate the fracturing fluid 108 directly into the subterranean formation 102, and/or the working string 112 may include ports that are spaced apart from the well bore wall to communicate the fracturing fluid 108 into an annulus in the well bore between the working string 112 and the well bore wall.

The working string 112 and/or the well bore 104 may include one or more sets of packers 114 that seal the annulus between the working string 112 and well bore 104 to define an interval of the well bore 104 into which the fracturing fluid 108 will be pumped. FIG. 2 shows two packers 114, one defining an uphole boundary of the interval and one defining the downhole end of the interval. When the fracturing fluid 108 is introduced into well bore 104 (e.g., in FIG. 2, the area of the well bore 104 between packers 114) at a sufficient hydraulic pressure, one or more fractures 116 may be created in the subterranean zone 102. The proppant particulates in the fracturing fluid 108 may enter the fractures 116 where they may remain after the fracturing fluid flows out of the well bore. These proppant particulates may "prop" fractures 116 such that fluids may flow more freely through the fractures 116.

In one embodiment, the peroxide source and perovskite family catalyst are interacted downhole as a second stage after the initial fracturing by the fracturing fluid. For example, the peroxide source can be included in the fracturing fluid and, thus, is pumped downhole in the fracturing fluid. The perovskite family catalyst can be introduced downhole so as to have a delayed triggered release. This can be by pumping the perovskite family catalyst downhole after the fracturing fluid or, more preferably by including the catalyst in the fracturing fluid in an encapsulated form so as to be de-capsulated after fracturing. Alternatively, both the peroxide source and perovskite family catalyst can be introduced downhole separately from the fracturing fluid in the second stage.

Once the catalyst is released, the catalyst interacts with the peroxide source to generate the oxidizer. Generally, the oxidizer generated is fundamentally gaseous oxygen. The released oxidizer breaks the gel of the fracturing fluid to lower its viscosity. The resultant lower viscosity fluid does not carry the proppant as readily as the gelled fracturing fluid; thus, the lower viscosity fluid can be removed from the well without carrying the proppant particulate out of the fracture. Additionally, the generated oxidizer can be used to enhance the fractures as will be realized from reference to FIG. 3.

In FIG. 3, a wellbore 200 in which fracturing has been carried out with a fracturing fluid as described in the above embodiment, is blocked by a plug 210 so as to prevent fluid flow up the bore hole. Generally, the plug will be placed after fracturing by the fracturing fluid but before the catalyst has interacted with the peroxide source to generate any substantial amount of oxidizer. After placement of the plug, the catalyst interacts with the peroxide source to generate the oxidizer. For example, when an encapsulated catalyst is used that is triggered by a pH change, a pH modifier can be introduced downhole just prior to sealing the plug in the wellbore.

The oxidizer is fundamentally gaseous oxygen and the rate of the gaseous generation is controlled by the concentration of peroxide source and the amount and particle size of catalyst. The interaction of the catalyst and peroxide source generated gaseous oxygen, which is blocked by plug 210 from movement up the bore hole. Thus, the gaseous oxygen 220 is channeled laterally to the bore hole so as to induce fractures 222 and enhance existing fractures 224 in the subterranean formation 230. Since the fracturing species is gaseous, it is expected to have better reach and penetration into the formation. Further, since the fracturing is not caused by fluids, the formation damage is minimized in terms of retention of maximum permeability.

While not specifically illustrated herein, the disclosed methods and compositions may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

To facilitate a better understanding of the present invention, the following example of certain aspects of some embodiments is given. In no way should the following examples be read to limit, or define, the entire scope of the invention.

EXAMPLE

About 1 gm of $La_{1-x}Sr_xFeO_3$ catalyst was taken in a 25 ml measuring cylinder. To this, 30% $H_2O_2$ was added to the brim. The measuring cylinder had a side aperture near the top end which was covered with a balloon to capture any gas that would be liberated. The top of the measuring cylinder was covered with Teflon tape so that any gas liberated would escape towards the side aperture with the balloon. As soon as the $H_2O_2$ came in contact with the catalyst, continuous bubbling was observed due to decomposition of the $H_2O_2$ in the presence of the catalyst. The quantity of gas bubbles eventually increased so that the balloon inflated due to the pressure of the gas. The example illustrates that when $H_2O_2$ comes in contact with a perovskite family catalyst, it starts the liberation of gaseous oxygen even without external stimuli or heat treatment.

In accordance with the above disclosure, several embodiments will now be described. In some embodiments, there is a treatment fluid for use in treating a subterranean formation. The treatment fluid comprises an aqueous base fluid, a source of peroxide and a perovskite family of catalyst. The perovskite family catalyst can be selected from the group consisting of perovskite family materials having the formula $\Phi_{1-x}\Psi_x\Omega_{1-\gamma}\Sigma_\gamma O_{3-\delta}$ and mixtures thereof, where $\Phi$ is La, Pr, Nd, Gd, Sm, Y or Ce; $\Psi$ is Mg, Ca, Sr or Ba; $\Omega$ is Ni, Cu, Mn, Fe or Co; and $\Sigma$ is Ni, Cu, Mn, Fe or Co; and where x and $\gamma$ are numbers ranging from 0.00 to 1.00. In addition, the source of peroxide can be selected from the group consisting of inorganic peroxides, organic peroxides, persulfates, persalts, a perborates, hypochlorite salts and combinations thereof.

In some embodiments, the perovskite family catalyst is selected from the group consisting of perovskite family materials having the formula $\Phi_{1-x}\Psi_x\Omega O_{3-\delta}$ and mixtures thereof, where $\Phi$ is La, Pr, Nd, Gd, Sm, Y or Ce; $\Psi$ is Mg, Ca, Sr or Ba; and $\Omega$ is Ni, Cu, Mn, Fe or Co; and where x is a number ranging from 0.0 to 1.0. In other embodiments, the perovskite family catalyst is selected from the group consisting of perovskite family materials having the formula $\Phi_{1-x}\Psi_x\Omega O_{3-\delta}$ and mixtures thereof, where $\Phi$ is La, Pr, Nd, Gd, Sm, Y or Ce; $\Psi$ is Mg, Ca, Sr or Ba; and $\Omega$ is Ni, Cu, Mn, Fe or Co; and where x is a number ranging from 0.1 to 0.9. In still other embodiments, the perovskite family catalyst is selected from the group consisting of perovskite family materials having the formula $La_{1-x}Sr_xFeO_{3-\delta}$ and mixtures thereof, where x is a number ranging from 0.1 to 0.9.

In the treatment fluid, the source of peroxide can be present in an amount of from about 0.3% to about 7% weight percent based on the total weight of treatment fluid. Additionally, the perovskite family catalyst can be present in an amount of from about 0.001% to about 20% weight percent based on the total weight of the treatment fluid.

Further, the treatment fluid can comprise a gelled component. The gelled component can be a cross-linked natural polymer. Also, in some embodiments the perovskite family catalyst is encapsulated.

Other embodiments are directed to a method of fracturing a subsurface formation having a well bore extending into the formation. The method can comprise the steps of:
 (a) forming a fracturing fluid comprising:
  an aqueous fluid;
  a gelled component; and
  proppant particles
 (b) introducing the fracturing fluid into a treatment zone of the well under sufficient pressure to generate fractures in the subterranean formation such that at least a portion of the proppant particles are introduced into the fractures;
 (c) introducing a perovskite family catalyst and a peroxide source to the subsurface formation such that gaseous oxygen is released which breaks said gelled component.

In some embodiments, the method further comprises the steps of:
 plugging the well bore such that the majority of the gaseous oxygen cannot travel uphole through the well bore;
 introducing fractures in the subterranean formation by the gaseous oxygen expanding laterally to the well bore.

In other embodiments, the method further comprises the steps of:
 forming a treatment fluid comprising:
  an second aqueous fluid;
  the peroxide source; and
  the perovskite family catalyst.

The treatment fluid is introduced to the subterranean formation in step (c) after step (b) has been performed.

In the method, the perovskite family catalyst can be selected from the group consisting of perovskite family materials having the formula $\Phi_{1-x}\Psi_x\Omega_{1-\gamma}\Sigma_\gamma O_{3-\delta}$ and mixtures thereof, where $\Phi$ is La, Pr, Nd, Gd, Sm, Y or Ce; $\Psi$ is Mg, Ca, Sr or Ba; $\Omega$ is Ni, Cu, Mn, Fe or Co; and $\Sigma$ is Ni, Cu, Mn, Fe or Co; and where x and $\gamma$ are numbers ranging from 0.00 to 1.00. In addition, the source of peroxide can be selected from the group consisting of inorganic peroxides, organic peroxides, persulfates, persalts, a perborates, hypochlorite salts and combinations thereof.

In some embodiments, the perovskite family catalyst is selected from the group consisting of perovskite family materials having the formula $\Phi_{1-x}\Psi_x\Omega O_{3-\delta}$ and mixtures thereof, where $\Phi$ is La, Pr, Nd, Gd, Sm, Y or Ce; $\Psi$ is Mg, Ca, Sr or Ba; and $\Omega$ is Ni, Cu, Mn, Fe or Co; and where x is a number ranging from 0.0 to 1.0. In other embodiments, the perovskite family catalyst is selected from the group consisting of perovskite family materials having the formula $\Phi_{1-x}\Psi_x\Omega O_{3-\delta}$ and mixtures thereof, where $\Phi$ is La, Pr, Nd, Gd, Sm, Y or Ce; $\Psi$ is Mg, Ca, Sr or Ba; and $\Omega$ is Ni, Cu, Mn, Fe or Co; and where x is a number ranging from 0.1 to 0.9. In still other embodiments, the perovskite catalyst is selected from the group consisting of perovskite family materials having the formula $La_{1-x}Sr_xFeO_{3-\delta}$ and mixtures thereof, where x is a number ranging from 0.1 to 0.9.

In some embodiments, the fracturing fluid is introduced into the well using one or more pumps. The methods outlined above can be especially useful when the well has a temperature at the subterranean formation of less than about 180° C.

Therefore, the present invention is well adapted to attain the ends and advantages mentioned, as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified, and all such variations are considered within the scope and spirit of the present invention. While compositions and methods are described in terms of "comprising," "containing," "having," or "including" various components or steps, the compositions and methods can also "consist essentially of" or "consist of" the various components and steps. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. The term "about" generally refers to a range of numbers that one of skill in the art would consider equivalent to the recited value (i.e., having the same function or result). In many instances, the term "about" may include numbers that are rounded to the nearest significant figure. Also, the terms in the claims have their plain, ordinary meaning unless otherwise explicitly and clearly defined by the patentee.

What is claimed is:

1. A method of fracturing a subsurface formation having a well bore extending into the formation, the method comprising the steps of:
(a) forming a fracturing fluid comprising:
an aqueous fluid,
a gelled component, and
proppant particles;
(b) introducing the fracturing fluid into a treatment zone of the well under sufficient pressure to generate fractures in the subterranean formation such that at least a portion of the proppant particles are introduced into the fractures;
(c) introducing a perovskite family catalyst and a peroxide source to the subsurface formation such that gaseous oxygen is released which breaks said gelled component;
(d) plugging the well bore such that the majority of the gaseous oxygen cannot travel uphole through the well bore; and
(e) introducing fractures in the subterranean formation by the gaseous oxygen expanding laterally to the well bore.

2. The method of claim 1, wherein the perovskite family catalyst and peroxide source are introduced in the fracturing fluid and wherein the perovskite family catalyst is encapsulated.

3. The method of claim 1, further comprising:
forming a treatment fluid comprising:
a second aqueous fluid;
the peroxide source; and
the perovskite family catalyst;
wherein the treatment fluid is introduced to the subterranean formation in step (c) after step (b).

4. The method of claim 1, wherein the perovskite family catalyst is selected from the group consisting of perovskite family materials having the formula $La_{1-x}SrFeO_{3-\delta}$ and mixtures thereof, where x is a number ranging from 0.1 to 0.9, and wherein $\delta$ represents oxygen ion deficiency due to any aliovalent substitution.

5. The method of claim 1, wherein the perovskite family catalyst is selected from the group consisting of perovskite family materials having the formula $\Phi_{1-x}\Psi_x\Omega_{1-\gamma}\Sigma_\gamma O_{3-\delta}$ and mixtures thereof, where $\Phi$ is La, Pr, Nd, Gd, Sm, Y or Ce; $\Psi$ is Mg, Ca, Sr or Ba; $\Omega$ is Ni, Cu, Mn, Fe or Co; and $\Sigma$ is Ni, Cu, Mn, Fe or Co; and where x and $\gamma$ are numbers ranging from 0.00 to 1.00, and wherein $\delta$ represents oxygen ion deficiency due to any aliovalent substitution.

6. The method of claim 1, wherein the perovskite family catalyst is selected from the group consisting of perovskite family materials having the formula $La_{1-x}Sr_xFeO_{3-\delta}$ and mixtures thereof, where x is a number ranging from 0.1 to 0.9, and wherein $\delta$ represents oxygen ion deficiency due to any aliovalent substitution.

7. The method of claim 1, wherein the source of peroxide is selected from the group consisting of inorganic peroxides, organic peroxides, persulfates, persalts, perborates, hypochlorite salts and combinations thereof.

8. The method according to claim 1, wherein the fracturing fluid is introduced into the well using one or more pumps.

9. A treatment fluid for use in treating a subterranean formation comprising:
an aqueous base fluid including a gelled component;
a source of peroxide; and
a perovskite family catalyst, wherein the perovskite family catalyst is encapsulated so as to be released after introduction into the well bore and wherein the perovskite family catalyst is selected from the group consisting of perovskite family materials having the formula $\Phi_{1-x}\Psi_x\Omega_{1-\gamma}\Sigma_\gamma O_{3-\delta}$ and mixtures thereof, where $\Phi$ is La, Pr, Nd, Gd, Sm, Y or Ce; $\Psi$ is Mg, Ca, Sr or Ba; $\Omega$ is Ni, Cu, Mn, Fe or Co; and $\Sigma$ is Ni, Cu, Mn, Fe or Co; and where x is a number ranging from 0.1 to 0.9, $\gamma$ is a number ranging from 0.0 to 1.0, and wherein $\delta$ represents oxygen ion deficiency due to any aliovalent substitution.

10. The treatment fluid of claim 9, wherein the perovskite family catalyst is selected from the group consisting of perovskite family materials having the formula $\Phi_{1-x}\Psi_x\Omega_{1-\gamma}\Sigma_\gamma O_{3-\delta}$ and mixtures thereof, where $\Phi$ is La, Pr, Nd, Gd, Sm, Y or Ce; $\Psi$ is Mg, Ca, Sr or Ba; and $\Omega$ is Ni, Cu, Mn, Fe or Co; and where x is a number ranging from 0.1 to 0.9.

11. The treatment fluid of claim 9, wherein the perovskite family catalyst is selected from the group consisting of perovskite family materials having the formula $La_{1-x}Sr_xFeO_{3-\delta}$ and mixtures thereof, where x is a number ranging from 0.1 to 0.9.

12. The treatment fluid of claim 9, wherein the source of peroxide is selected from the group consisting of inorganic peroxides, organic peroxides, persulfates, persalts, a perborates, hypochlorite salts and combinations thereof.

13. The treatment fluid of claim 9, wherein the source of peroxide is present in an amount of from about 0.3% to about 7% weight percent based on the total weight of treatment fluid.

14. The treatment fluid of claim 9, wherein the perovskite family catalyst is present in an amount of from about 0.001% to about 20% weight percent based on the total weight of the treatment fluid.

15. The treatment fluid of claim 9, wherein the gelled component is a cross-linked natural polymer.

* * * * *